(12) United States Patent
Porte et al.

(10) Patent No.: US 6,896,099 B2
(45) Date of Patent: May 24, 2005

(54) AIRCRAFT ENGINE POD WITH ACOUSTIC ATTENUATION

(75) Inventors: Alain Porte, Colomiers (FR); Hervé Batard, Tournefeuille (FR)

(73) Assignee: Airbus France, Toulouse (FR)

( * ) Notice: Subject to any disclaimer, the term of this patent is extended or adjusted under 35 U.S.C. 154(b) by 138 days.

(21) Appl. No.: 10/321,504

(22) Filed: Dec. 18, 2002

(65) Prior Publication Data

US 2004/0094359 A1 May 20, 2004

(30) Foreign Application Priority Data

Nov. 18, 2002 (FR) .............................. 02 14380

(51) Int. Cl.[7] .................... B64D 33/02; F02K 1/00; G10K 11/02; G10K 11/16; F01D 25/00
(52) U.S. Cl. ................ 181/214; 181/210; 181/213; 244/1 N; 415/119
(58) Field of Search ................ 181/214, 210, 181/213, 204, 205, 290, 292; 244/1 N, 53 B; 415/9, 119, 174.4

(56) References Cited

U.S. PATENT DOCUMENTS

| | | | | | |
|---|---|---|---|---|---|
| 3,477,231 | A | * | 11/1969 | Paulson .................... | 181/214 |
| 4,122,672 | A | | 10/1978 | Lowrie ..................... | 60/226 R |
| 4,452,335 | A | * | 6/1984 | Mathews et al. .......... | 181/214 |
| 4,452,563 | A | * | 6/1984 | Belanger et al. .......... | 181/213 |
| 4,969,535 | A | | 11/1990 | Arcas et al. ............... | 181/213 |
| 5,014,815 | A | | 5/1991 | Arcas et al. ............... | 181/213 |
| 5,025,888 | A | | 6/1991 | Arcas et al. ............... | 181/213 |
| 5,482,429 | A | * | 1/1996 | Penda ...................... | 415/119 |
| 5,702,231 | A | * | 12/1997 | Dougherty ................ | 415/119 |
| 5,823,739 | A | * | 10/1998 | Van Duyn ................ | 415/9 |
| 5,841,079 | A | * | 11/1998 | Parente .................... | 181/214 |
| 6,123,170 | A | * | 9/2000 | Porte et al. ............... | 181/214 |
| 6,149,380 | A | * | 11/2000 | Kuzniar et al. ........... | 415/9 |
| 6,206,631 | B1 | * | 3/2001 | Schilling .................. | 415/9 |
| 6,371,721 | B1 | * | 4/2002 | Sathianathan et al. .... | 415/9 |
| 6,382,905 | B1 | * | 5/2002 | Czachor et al. ........... | 415/9 |
| 6,592,078 | B2 | * | 7/2003 | Porte et al. ............... | 244/134 B |
| 6,619,913 | B2 | * | 9/2003 | Czachor et al. ........... | 415/119 |
| 6,638,008 | B2 | * | 10/2003 | Sathianathan et al. .... | 415/9 |
| 2002/0125067 | A1 | | 9/2002 | Porte et al. ............... | 181/210 |
| 2004/0007422 | A1 | * | 1/2004 | Porte et al. ............... | 181/210 |

FOREIGN PATENT DOCUMENTS

| | | |
|---|---|---|
| EP | 1167185 | 1/2002 |
| FR | 2347539 | 11/1977 |
| FR | 2821788 | 9/2002 |

OTHER PUBLICATIONS

Preliminary Search Report dated Jul. 18, 2003 (English translation attached).

* cited by examiner

*Primary Examiner*—Edgardo San Martin
(74) *Attorney, Agent, or Firm*—Stevens, Davis, Miller & Mosher, LLP

(57) ABSTRACT

An internal duct of an aircraft engine pod may include a fan and a tubular air intake having a first acoustic attenuation internal tubular piece. The first acoustic attenuation internal tubular piece is acoustically homogeneous, is of the resonator type, and has no internal assembly fish-plate. Additionally, the internal duct may include a tubular fan casing and a tubular transition part for connecting the air intake to the fan casing. An internal face of the tubular transition part is acoustically homogeneous also. Moreover, the internal face of the first acoustic attenuation internal tubular piece and the internal face of the tubular transition part are disposed in aerodynamic continuity.

10 Claims, 5 Drawing Sheets

AIRCRAFT ENGINE POD WITH ACOUSTIC ATTENUATION

BACKGROUND OF THE INVENTION

The present invention relates to an aircraft engine pod with optimized acoustic attenuation.

It is known that the engines fitted to aircraft are sources of noise at a very high level. This is particularly troublesome when the aircraft equipped with these engines is located near to an inhabited area, for example during takeoff or landing. Environmental standards, which are becoming increasingly strict, dictate that the noise level of an aircraft, and therefore the noise level of the engines, be kept below a legislatory threshold so as to limit the noise nuisance suffered by the inhabitants of said area. This legislatory threshold is sometimes reduced further during the night, which means that the noisiest aircraft can then neither land nor take off, which is a constraint, or even a loss of potential income, for the airlines which operate such aircraft. In consequence, it is desirable to reduce the level of acoustic emissions of such an engine to below said regulatory thresholds so as to be able to operate profitably.

It is also known that a great deal of the noise generated by an aircraft engine comes from the fan of the latter arranged in the internal duct of the pod of said engine and that this internal duct consists of a tubular air intake extended, on one side, by a flared air intake peripheral lip and, on the other side, by a tubular transition part connecting it to the casing of said fan and having the main objectives of allowing ease of assembly and disassembly of said air intake and of protecting the latter against wear and foreign object damage resulting from objects sucked in by the fan.

In the known way, there is provided, on the internal surface of said air intake, an acoustic attenuation internal tubular piece, of the resonator type, allowing some of the soundwaves from the fan to be trapped, and thus reducing the level of noise emitted to the outside by the engine.

Such an acoustic attenuation internal tubular piece generally has a cellular-core(s) sandwich structure and, in a known way, may be made as a single piece. However, for ease of construction and fitting, this internal piece is usually made as several shells, each of which forms a longitudinal part of said piece and which are assembled by means of longitudinal fishplates which join the facing lateral edges of adjacent shells together.

Such fishplates generally comprise a longitudinal fishplate strip arranged on the external side of said tubular piece and a longitudinal fishplate strip arranged on the internal side thereof. The internal longitudinal fishplate strips constitute areas of the interior surface of the air intake in which, on the one hand, the noise is not absorbed and, on the other hand, the soundwaves are diffracted, this having the effect of diluting the acoustic energy from near the wall toward the axis of the engine and thus of greatly degrading, in terms of noise level reduction, the performance of said piece by comparison with a monolithic piece.

DESCRIPTION OF THE PRIOR ART

In an attempt to avoid this drawback, the lateral edges of the adjacent shells which are to be joined together are configured in a special way, for example thinning them continuously or stepwise, or inserting a densified cellular core therein, etc. (see, for example, the prior documents U.S. Pat. No. 4,840,093, U.S. Pat. No. 4,969,535, U.S. Pat. No. 5,014,815, U.S. Pat. No. 5,025,888 and EP-1 167 185). In all cases, these configurations are lengthy, tricky and expensive.

In any event, experience has shown that, even with a one-piece acoustic attenuation tubular piece, the attenuation thus afforded is not optimum.

SUMMARY OF THE INVENTION

The purpose of the present invention is to overcome this drawback, to increase the attenuation performance of said internal piece of the air intake and to eliminate almost completely the noise emitted by the engine fan.

To this end, according to the invention, the aircraft engine pod, the internal duct of which contains a fan and comprises:
  a tubular air intake comprising a first acoustic-attenuation internal tubular piece, of resonator type;
  a tubular fan casing; and
  a tubular transition part connecting said air intake to said fan casing,
is notable in that:
  said first acoustic attenuation internal tubular piece has no internal assembly fishplate (for example because it is produced in a single piece or as several pieces assembled via their external faces);
  said tubular transition part has an acoustically homogeneous internal face; and
  the internal face of said first acoustic attenuation internal tubular piece and said internal face of said tubular transition part are in aerodynamic continuity.

The idea underlying the present invention results from the observation that acoustic nonhomogeneity between the fan and the first acoustic attenuation tubular piece reduces the effectiveness of the latter. Thus, said tubular transition part, which is indispensable but which represents only a very small part of the surface of the internal duct of the pod, is in actual fact the cause of the limitation on the performance of the acoustic attenuation internal piece of the air intake and this, hitherto, has escaped the attention of the person skilled in the art precisely because of the insignificant size of said tubular transition part.

The applicant company has found and verified that said tubular transition part (if not acoustically homogeneous) contaminates, particularly by diffraction, the acoustic emissions of the fan and alters their characteristics by addition of parasitic modes, which means that said acoustic attenuation internal piece of the air intake receives destructured waves which differ greatly from those emitted by the fan, although it is designed specifically to attenuate the latter waves. The acoustic attenuation performance of this internal piece cannot therefore be good.

By contrast, in the engine pod according to the present invention, thanks to the acoustic homogeneity of said tubular transition part, the soundwaves emitted by the fan are appreciably less diffracted, which means that said first acoustic attenuation internal piece of the air intake receives, without deformation, the waves (those emitted by the fan) it is supposed to attenuate. The attenuation performance of said first piece is therefore particularly optimum.

Said tubular transition part with acoustically homogeneous internal face may be made in several pieces or as a single piece and may be made of metal, composite, etc. As a preference, it is formed of an annulus the internal face of which forms the internal face of said tubular transition part. Advantageously, this annulus forms an integral part of the fan casing.

As an alternative, said tubular transition part may comprise a second acoustic attenuation internal tubular piece of resonator type (similar to said first acoustic attenuation internal tubular piece of said air intake), said second tubular piece having no internal assembly fishplate and the internal face of said tubular transition part being formed by the internal face of said second tubular piece.

It will be noted that said second internal piece not only allows the performance of said first internal piece to be improved, but also in itself plays a part in the acoustic attenuation of the soundwaves emitted by the fan.

Advantageously, said tubular fan casing comprises an external annulus extending it on the same side as said tubular air intake and said external annulus surrounds said second acoustic attenuation internal tubular piece of said tubular transition part.

In this case, said external annulus may be connected removably to said air intake or be secured to said first internal tubular piece. Said second internal tubular piece may form an integral part of said first internal tubular piece.

In the general case where said tubular air intake is extended, on the opposite side to said fan casing, by a flared air intake peripheral lip, the attenuation of the waves emitted by the fan can be further improved by providing, on the same side as the wall of said air intake lip, a third acoustic attenuation internal tubular piece, of resonator type, having no internal assembly fishplate, the internal face of said third internal piece being in aerodynamic continuity with the internal face of said first acoustic attenuation internal tubular piece.

The fan casing may bear, on its internal wall, an aerodynamic sealing tubular coating made of a material capable of being eroded and placed facing the blades of the fan, the internal face of said sealing coating being in aerodynamic continuity with the internal face of said tubular transition part.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENTS

Figure 1:
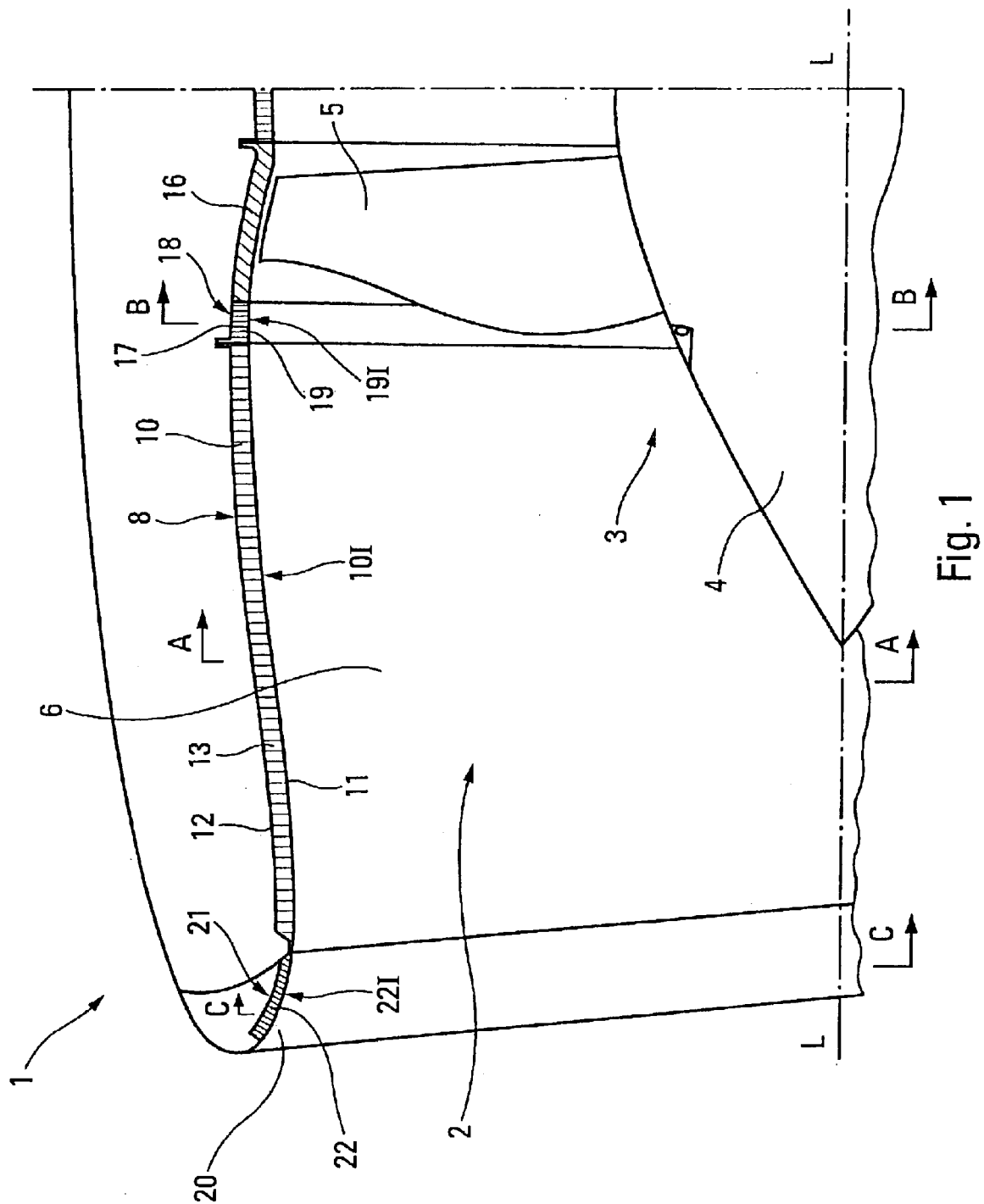
FIG. 1 is a partial and schematic axial half section of the front part of an engine pod according to the present invention.

The front part of the engine pod 1 according to the present invention, depicted in part and schematically in FIG. 1, defines an internal duct 2 inside which a fan 3 is arranged. The fan 3 comprises a rotary hub 4 of axis L—L, provided with blades 5.

Forward of the blades 5, the internal duct 2 forms a tubular air intake 6.

Figure 2:
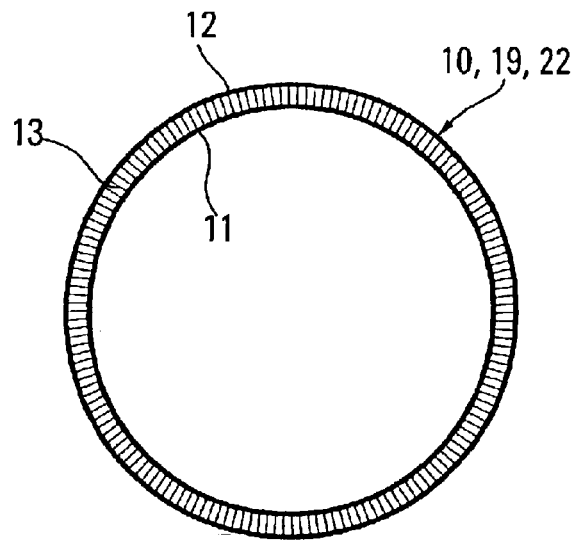
FIG. 2 corresponds to a schematic cross section on the section lines A—A, B—B or C—C of FIG. 1.
Figure 3:
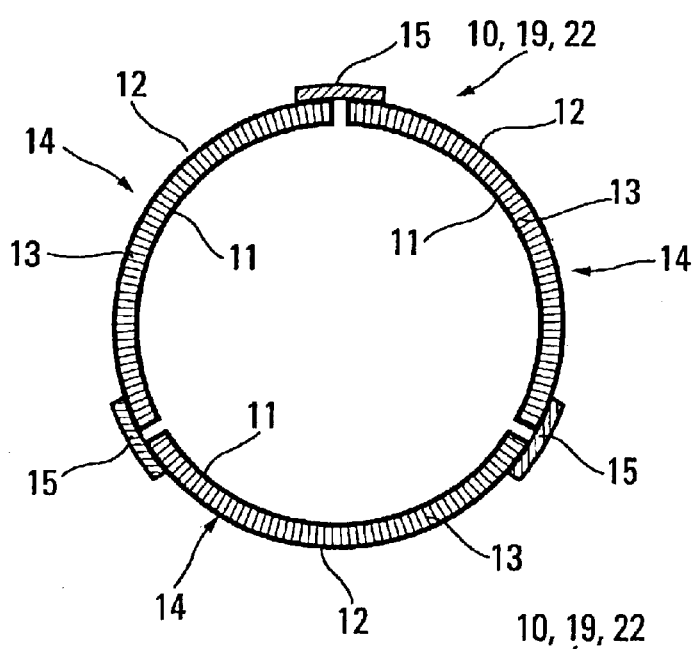
FIGS. 3 and 4 illustrate, in schematic cross section corresponding to the section lines A—A, B—B or C—C in FIG. 1, two alternative forms of the embodiment illustrated in FIG. 2.

In a known way, the wall 8 of the air intake 6 is formed of an acoustic attenuation tubular piece 10 comprising a permeable internal skin 11, an impermeable external skin 12 and a cellular core 13 inserted between said internal and external skins 11 and 12. The acoustic attenuation piece 10 may, for example, be produced in a single piece (see FIG. 2) or as several longitudinal shells 14 assembled by external fishplate strips 15 (see FIG. 3) or by an external annulus 15A (see FIG. 4). Whatever its embodiment, the acoustic attenuation piece 10 has no assembly fishplate on its internal face 10I, consisting of the internal skin 11.

Facing the blades 5 of the fan 3, the internal duct 2 is formed by a metal tubular fan casing 16 which (as will be seen hereinafter on studying FIG. 5) has a coating 27 of a material able to be eroded under the action of the particulate materials absorbed by the fan 3, said coating providing an aerodynamic seal with the free ends of the blades 5.

Between the air intake 6 and the fan casing 16, the internal duct 2 consists of a shape transition tubular part 17 connecting the latter two elements.

The wall 18 of the shape transition part 17 comprises an acoustic attenuation tubular piece 19 which, just like the acoustic attenuation tubular piece 10, comprises a permeable internal skin 11, an impermeable external skin 12 and a cellular core 13 inserted between said internal and external skins 11 and 12. The acoustic attenuation piece 19 has no assembly fishplate on its internal face 19I, consisting of the internal skin 11. Furthermore, said internal face 19I of the piece 19 is in aerodynamic continuity with the internal face 10I of the piece 10.

On the opposite side to the fan 3, the tubular air intake 6 is extended by a flared peripheral air intake lip 20. The wall 21 of said air intake lip 20 comprises an acoustic attenuation tubular piece 22 which, just like the pieces 10 and 19, comprises a permeable internal skin 11, an impermeable external skin 12 and a cellular core 13 inserted between said internal and external skins 11 and 12. The acoustic attenuation piece 22 has no assembly fishplate on its internal face 22I, consisting of the skin 11. In addition, the internal face 22I of the piece 22 is in aerodynamic continuity with the internal face 10I of the piece 10.

Figure 4:
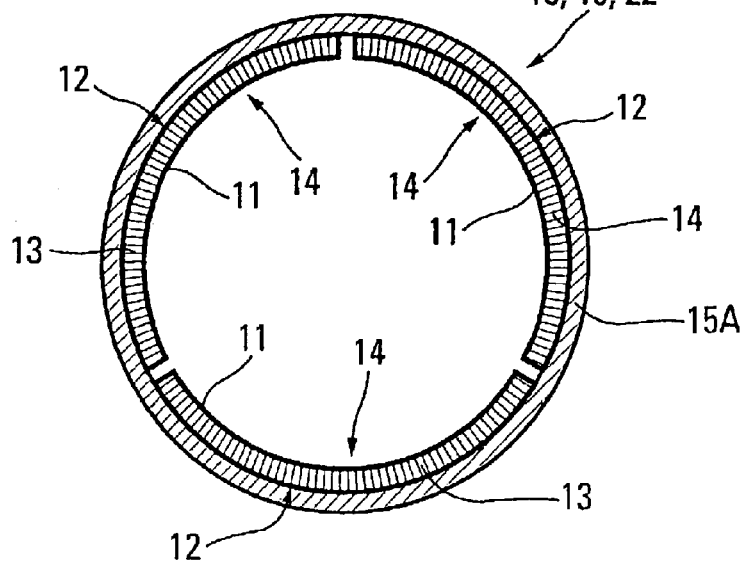
Figure 5:
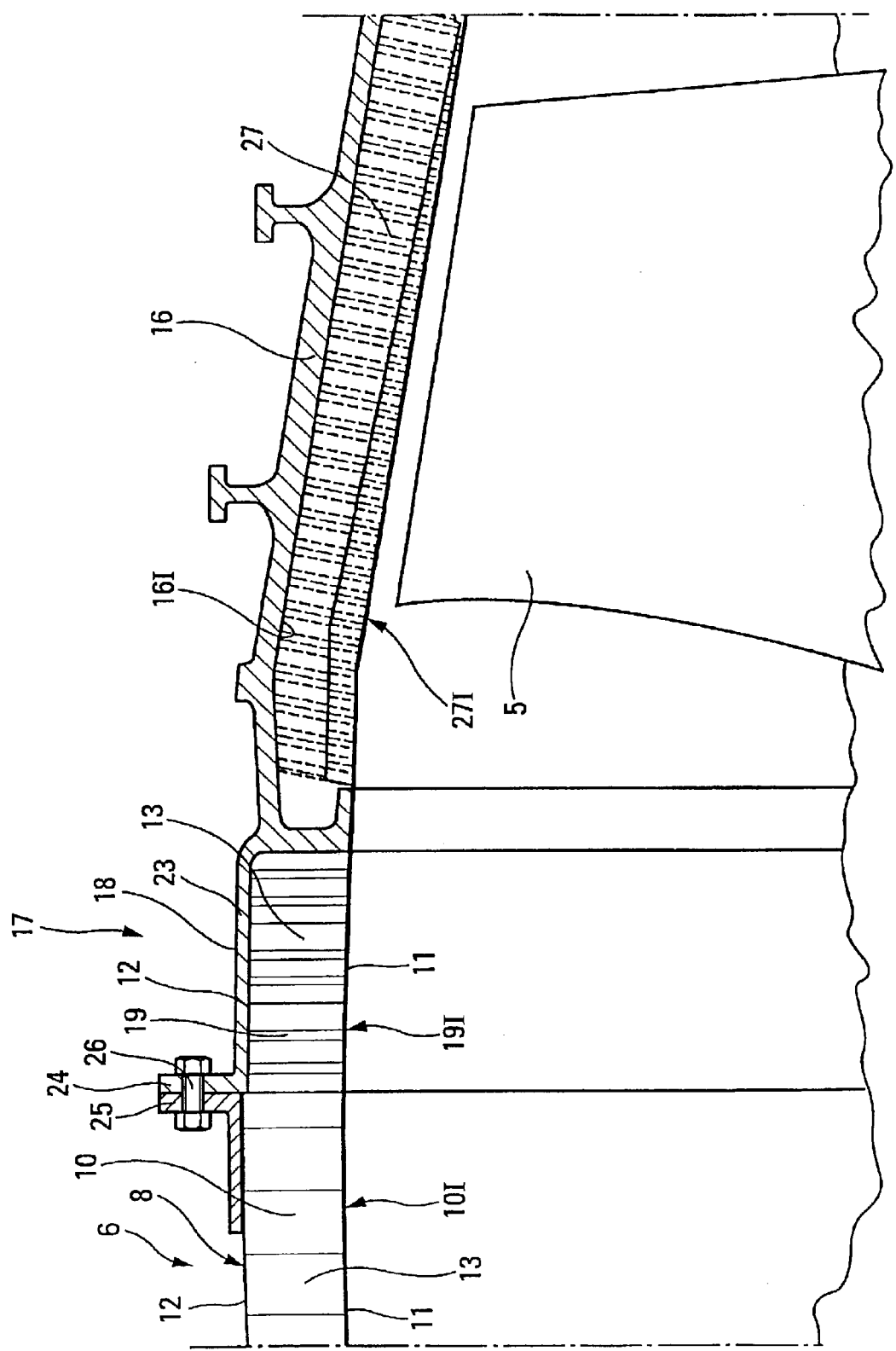
FIG. 5 shows, on an enlarged scale, one practical embodiment of the shape transition tubular part, according to the present invention, for the pod of FIGS. 1 to 4.

In the practical embodiment depicted partly and on a larger scale in FIG. 5, the fan casing 16 comprises an external extension forming an annulus 23 similar to the annulus 15A of FIG. 4 and constituting the wall 18 of the shape transition part 17. This annulus 23, which forms an integral part of the fan casing 16, bears the acoustic attenuation piece 19. At its end on the same side as the tubular air intake 6, the annulus 23 is shaped as a flange 24. This flange 24 is able to collaborate with a flange 25, secured to the piece 10, to secure the air intake 6 and the shape transition part 17, by virtue of fixing means 26.

It will be noted that, as an alternative, in the device of FIG. 5, the acoustic attenuation piece 19 may be secured to the acoustic attenuation piece 10, for example being an integral part thereof, and project beyond the flange 25 so that this acoustic piece 19 is introduced into or extracted from the annulus 23 during assembly and disassembly of the air intake 6 and of the fan casing 16.

Furthermore, FIG. 5 depicts the erodable sealing tubular coating 27 borne by the internal wall 16I of the fan casing 16. The internal face 27I of the coating 27 is in aerodynamic continuity with the internal face 19I of the acoustic attenuation piece 19 of the shape transition part 17.

Figure 6:
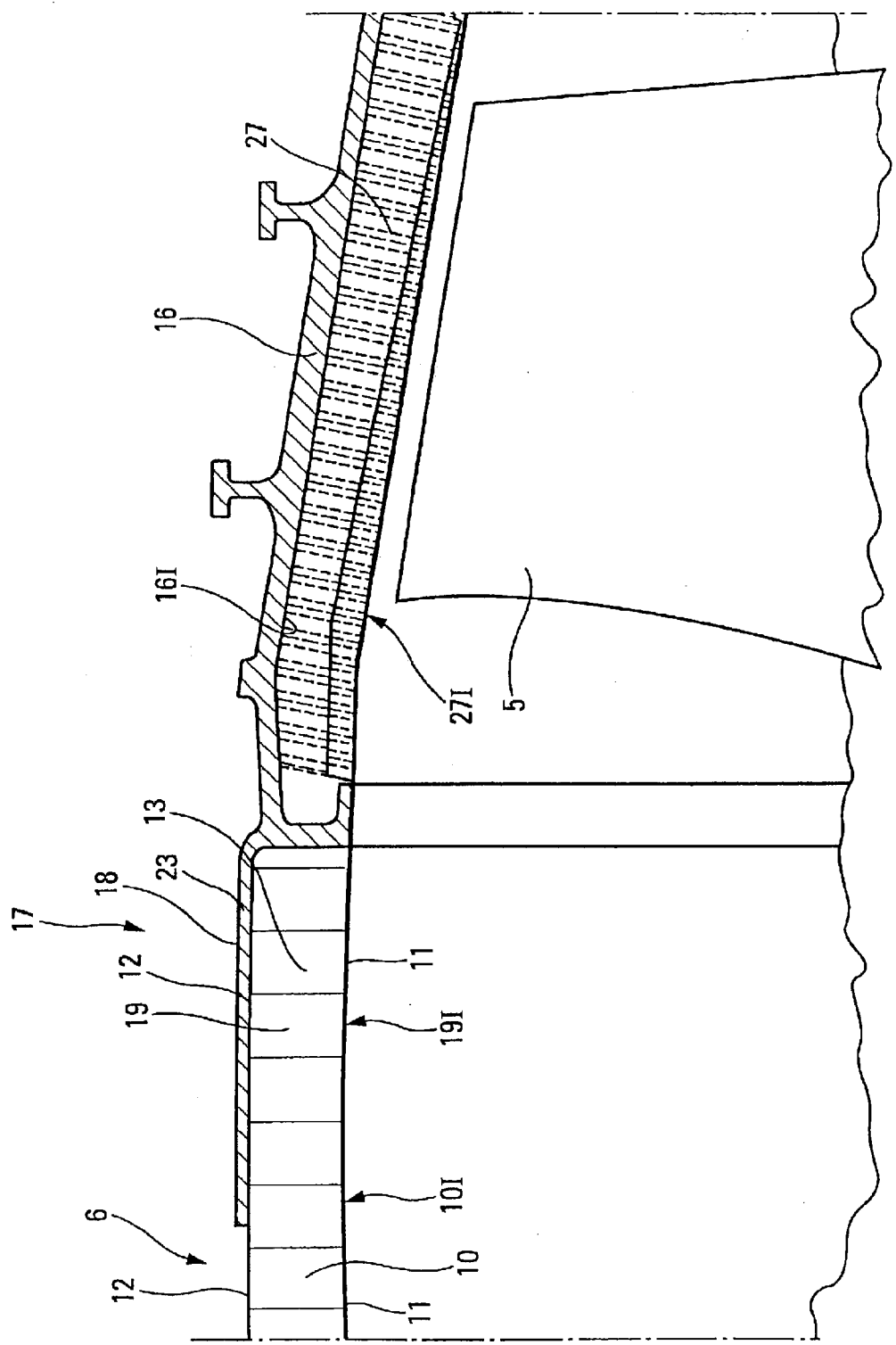
FIGS. 6 and 7 show, in a similar way to FIG. 5, two alternative forms of embodiment of the present invention.

In the alternative form of embodiment shown by FIG. 6, the acoustic attenuation tubular piece 19 forms an integral part of the acoustic attenuation tubular piece 10, constituting the marginal part thereof arranged on the same side as the fan casing 16. In addition, the acoustic attenuation tubular piece 10 is secured to the annulus 23 (itself secured to the fan casing 16) by said marginal part 19.

Figure 7:
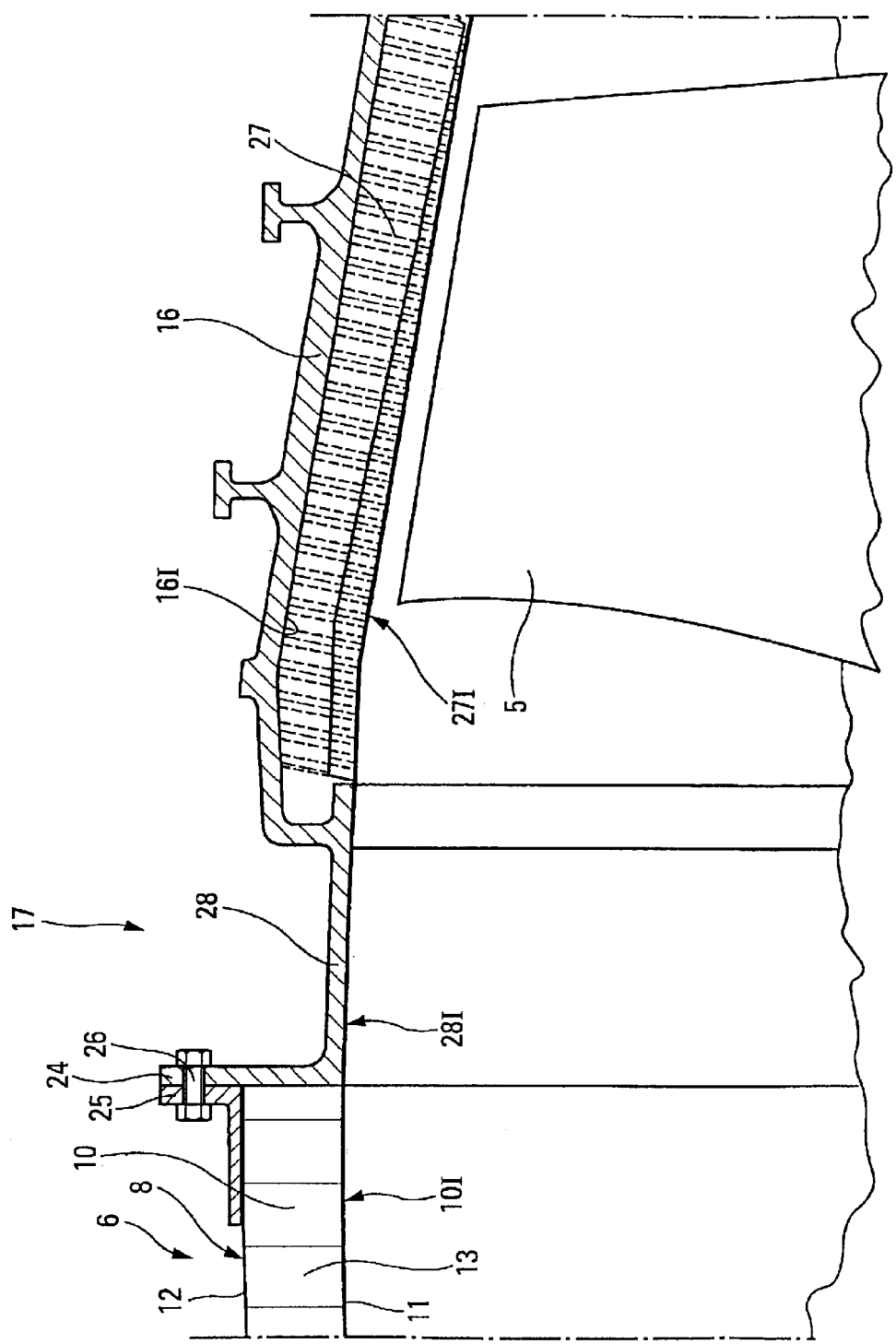

In the alternative form of embodiment of FIG. 7, the fan casing 16 comprises, toward the tubular air intake 6, an extension 28 in the form of a one-piece annulus connected to said air intake 6 by the flanges 24, 25 and by the fixing means 26. The plain internal face 28I of the annulus 28 ensures continuity between the internal face 10I of the air intake 6 and the internal face 27I of the fan casing 16.

What is claimed is:

1. An aircraft engine pod, an internal duct of which contains a fan and comprises:
    a tubular air intake comprising a first acoustic attenuation internal tubular piece, of resonator type, having no internal assembly fish-plate and being acoustically homogeneous;
    a tubular fan casing; and
    a tubular transition part connecting maid air intake to said fan casing and having an acoustically homogeneous internal face,
    the internal face of said first acoustic attenuation internal tubular piece and said internal face of said tubular transition part being in aerodynamic continuity.

2. The engine pod as claimed in claim 1, wherein said tubular transition part is formed by an annulus, the internal face of which forms the internal face of said tubular transition part.

3. The engine pod as claimed in claim 2, wherein said annulus forms an integral part of said tubular fan casing.

4. The engine pod as claimed in claim 1, wherein said tubular transition part has a second acoustic attenuation internal tubular piece of resonator type, which has no internal assembly fishplate and the internal face of which forms the internal face of said tubular transition part.

5. The engine pod as claimed in claim 4, wherein said tubular fan casing comprises an external annulus extending it on the same side as said tubular air intake and wherein said external annulus surrounds said second acoustic attenuation internal tubular piece of said tubular transition part.

6. The engine pod as claimed in claim 5, wherein said external annulus is connected removably to said air intake.

7. The engine pod as claimed in claim 5, wherein said external annulus is secured to said first acoustic attenuation internal tubular piece.

8. The engine pod as claimed in claim 5, wherein said second acoustic attenuation internal tubular piece forms an integral part of said first acoustic attenuation internal tubular piece.

9. The engine pod as claimed in claim 1, in which said tubular air intake is extended, on the opposite side to said fan casing, by a flared air intake peripheral lip, wherein said air intake lip also comprises an acoustic attenuation internal tubular piece, of resonator type, the internal face of which has no assembly fishplate and is in aerodynamic continuity with the internal face of said first acoustic attenuation internal tubular piece.

10. The engine pod as claimed in claim 1, wherein said fan casing bears, on its internal wall, an aerodynamic sealing tubular coating made of a material capable of being eroded and placed facing the blades of the fan and wherein the internal face of said sealing coating is in aerodynamic continuity with the internal face of said tubular transition part.

* * * * *